United States Patent
Kinzl et al.

(10) Patent No.: US 10,858,598 B2
(45) Date of Patent: Dec. 8, 2020

(54) METHOD FOR PURIFYING AN ASPHALTENE-CONTAINING FUEL

(71) Applicant: Siemens Aktiengesellschaft, Munich (DE)

(72) Inventors: Markus Kinzl, Dietzenbach (DE); Ansgar Kursawe, Niedernhausen (DE); Sebastian Löw, Frankfurt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/089,617

(22) PCT Filed: Mar. 2, 2017

(86) PCT No.: PCT/EP2017/054920
§ 371 (c)(1),
(2) Date: Sep. 28, 2018

(87) PCT Pub. No.: WO2017/182187
PCT Pub. Date: Oct. 26, 2017

(65) Prior Publication Data
US 2019/0112535 A1    Apr. 18, 2019

(30) Foreign Application Priority Data

Apr. 22, 2016 (DE) .................... 10 2016 206 900

(51) Int. Cl.
*C10G 53/06* (2006.01)
*F02C 6/00* (2006.01)
(Continued)

(52) U.S. Cl.
CPC ........... *C10G 53/06* (2013.01); *C10G 21/003* (2013.01); *F02C 1/00* (2013.01); *F02C 6/00* (2013.01);
(Continued)

(58) Field of Classification Search
None
See application file for complete search history.

(56) References Cited

U.S. PATENT DOCUMENTS 3,278,414 A    10/1966    Bushnell et al.
5,976,361 A    11/1999    Hood et al.
(Continued)

FOREIGN PATENT DOCUMENTS

EP    0757091 A1    2/1997
JP    2006067100 A    3/2006
(Continued)

OTHER PUBLICATIONS

International Search Report and Written Opinion dated May 12, 2017, for corresponding PCT/EP2017/054920.

*Primary Examiner* — Tam M Nguyen
(74) *Attorney, Agent, or Firm* — Wolter Vandyke Davis, PLLC

(57) ABSTRACT

A method for purifying an asphaltene-containing fuel where the asphaltene-containing fuel is supplied to a deasphalting unit in which asphaltene contained in the fuel is separated using a solvent, thereby forming a substantially deasphalted fuel. The solvent is separated from the deasphalted fuel in a solvent recovery unit after a successful separation of the asphaltene from the fuel, and the waste heat of turbine exhaust gas produced in a gas turbine when converting fuel into electricity is used in order to purify the asphaltene-containing fuel. A corresponding device is used for purifying an asphaltene-containing fuel.

18 Claims, 3 Drawing Sheets

(51) Int. Cl.
  *F02C 6/18* (2006.01)
  *C10G 21/00* (2006.01)
  *F02C 1/00* (2006.01)
  *F02C 7/14* (2006.01)
  *F02C 7/224* (2006.01)

(52) U.S. Cl.
  CPC ........... *F02C 6/18* (2013.01); *F02C 7/14* (2013.01); *F02C 7/224* (2013.01); *C10G 2300/206* (2013.01); *C10G 2300/4081* (2013.01); *F05D 2220/32* (2013.01); *F05D 2260/213* (2013.01)

(56) References Cited

U.S. PATENT DOCUMENTS

| | | | |
|---|---|---|---|
| 2002/0112986 A1* | 8/2002 | Li | C10G 55/04 |
| | | | 208/86 |
| 2011/0094937 A1 | 4/2011 | Subramanian et al. | |
| 2013/0240407 A1* | 9/2013 | Gillis | C10G 55/04 |
| | | | 208/86 |
| 2016/0068768 A1* | 3/2016 | Ganyu | C10G 21/30 |
| | | | 208/86 |

FOREIGN PATENT DOCUMENTS

| | | |
|---|---|---|
| JP | 2007508745 A | 4/2007 |
| JP | 2012103176 A | 5/2012 |
| JP | 2013007949 A | 1/2013 |
| WO | 9811971 A1 | 3/1998 |
| WO | 3845387 A1 | 10/1998 |
| WO | 03078549 A1 | 9/2003 |
| WO | 2005038705 A2 | 4/2005 |
| WO | 2014152329 A1 | 9/2014 |
| WO | 2016192895 A1 | 12/2016 |

* cited by examiner

METHOD FOR PURIFYING AN ASPHALTENE-CONTAINING FUEL

CROSS REFERENCE TO RELATED APPLICATIONS

This application is the US National Stage of International Application No. PCT/EP2017/054920 filed Mar. 2, 2017, and claims the benefit thereof. The International Application claims the benefit of German Application No. DE 102016206900.4 filed Apr. 22, 2016. All of the applications are incorporated by reference herein in their entirety.

FIELD OF INVENTION

The invention relates to a process for purifying an asphaltene-containing fuel. The invention further relates to a corresponding apparatus for purifying an asphaltene-containing fuel.

BACKGROUND OF INVENTION

Crude and heavy oils are frequently employed in the context of energy generation, being available as inexpensive fuels for energy production by gas turbines. However, such crude and heavy oils contain asphaltenes which in turn contain chemically bound heavy metals such as vanadium or nickel. The combustion of the oils releases these heavy metals in the form of metal oxides. The metal oxides in turn form alloys with the metals of the turbine blades and corrode or weaken them.

In addition, asphaltenes, irrespective of their metal content, have the propensity to precipitate out in solid form in the event of significant changes in pressure or temperature. These solid asphaltene particles can block conduits or fine nozzles of the burners used and hence have a lasting effect on mixture formation in the turbine, which reduces the efficiency of the turbine. The combustion of crude oils in gas turbines is thus subject to high demands.

Crude oils are only of limited suitability for conversion to power in gas turbines since modern high-performance turbines tolerate heavy metals such as nickel or vanadium in the fuel only up to values below the concentration in most crude oils. For this reason alone, the utilization thereof is not an option in heavy metal-sensitive high-performance turbines. Corresponding pre-treatment of the fuels prior to utilization thereof in a gas turbine is thus indispensable.

In order to separate the asphaltenes and heavy metals from a corresponding crude oil and hence to process the crude oil for combustion in gas turbines, what are called deasphaltation processes are known. Deasphaltation processes are based on extraction of asphaltenes by addition of saturated aliphatic hydrocarbons as precipitant or as solvent for the remaining oil constituents.

Since the heavy metals present in a crude oil are highly enriched in the asphaltenes, removal of the asphaltenes leads to immediate removal of the heavy metals. Mixing of the crude oil containing asphaltenes and heavy metals with an appropriate solvent or deasphalting agent results in precipitation of the asphaltenes, converting the heavy crude oil to a moderately heavy or light crude oil.

The precipitated asphaltenes and the heavy metals that are simultaneously removed in the precipitation of the asphaltenes are separated from the crude oil and removed from the process. The deasphalted crude oil can then be combusted in a gas turbine. The solvent is recovered from the process and ideally recycled into the deasphaltation process.

There also exists the option of controlled preliminary concentration of the fuel prior to the actual deasphaltation process. In this case, a fraction comprising the low-boiling fuel constituents is separated from the asphaltene-containing fuel to be purified. The result is a fuel fraction concentrated in high-boiling constituents and in asphaltenes and heavy metals, which is then sent to the deasphaltation. The fraction comprising the low-boiling fuel constituents is essentially free of heavy metals such as vanadium and nickel and can be sent to and converted to power in a vanadium-sensitive high-performance turbine, for example.

However, the above-described processes for recovery of the solvent used and the preliminary concentration require high temperatures of several hundred degrees Celsius. In the case of high throughputs of fuel to be pretreated, correspondingly large amounts of thermal energy have to be introduced, for example by means of external heaters, which puts the economic viability of the overall process in question.

SUMMARY OF INVENTION

A first object of the invention is that of specifying a process by means of which an economically improved separation, compared to standard processes, of asphaltenes from an asphaltene-containing fuel is achieved.

A second object of the invention is that of specifying an apparatus that permits corresponding economically viable separation of asphaltenes from an asphaltene-containing fuel.

The first object of the invention is achieved in accordance with the invention by a process for purifying an asphaltene-containing fuel, wherein the asphaltene-containing fuel is sent to a deasphaltation unit in which asphaltenes present in the fuel are separated off by means of a solvent to form an essentially deasphalted fuel, wherein the solvent, on completion of separation of the asphaltenes from the fuel, is separated from the deasphalted fuel in a solvent recovery unit, and wherein the purifying of the asphaltene-containing fuel utilizes the waste heat from a turbine offgas formed in a conversion of fuel to power in a gas turbine.

In a first step, the invention is based on the consideration that it is possible in principle to take the energy required for processing of an asphaltene-containing fuel prior to conversion thereof to power in a gas turbine from the power plant process itself. In this case, however, it would be necessary to accept an unwanted reduction in power plant efficiency or a loss in power of the power plant.

In a second step, the invention proceeds from the further fact that the operation of a typical single-cycle gas turbine power plant gives rise to hot turbine offgas, called flue gas. The turbine offgas typically has temperatures around 500° C. The energy content of the turbine offgas thus distinctly exceeds the demand for energy for the purification of a fuel. However, the turbine offgas, or the flue gas, is sometimes released into the environment unutilized.

The invention now combines these facts and recognizes, in a third step, that the waste heat from the turbine offgas that has been unutilized to date can be utilized in a controlled manner in order to process or pretreat asphaltene-containing fuels for conversion thereof to power in a gas turbine. The heat from the hot offgas is transferred to the purification process and utilized here within the process steps where temperature control is necessary.

This applies both to temperature control of media flowing within the process and the temperature control of apparatuses used for performance of the purification. For this purpose, the offgas from single-cycle gas turbine power plants provides sufficient "free" waste heat in order to operate the process without external heating and associated additional fuel costs.

In other words, the process offers the option of energy-optimized integration of a fuel purification into an overall power plant process in which the purification of the fuel is effected by the transfer of hitherto unutilized heat essentially without loss of power plant efficiency or without loss of power. Heat integration is achieved by utilization of the energy from the offgas from a gas turbine. Especially in the case of high energy demand, heat integration can also be effected via the utilization of the energy from offgases from multiple gas turbines.

The fuel to be purified which is used is especially a crude oil wherein the main constituents, aside from the asphaltenes, i.e. highly condensed aromatic hydrocarbons, are in particular alkanes, alkenes and cycloalkanes. In addition, aliphatic and heterocyclic nitrogen and sulfur compounds also occur.

In order to be able to separate off the asphaltenes present in the fuel, the fuel is sent to the deasphaltation unit in which the asphaltenes are separated off by means of a solvent. On entry into the deasphaltation unit, the temperature of the asphaltene-containing fuel is typically about 60° C. Solvents or deasphalting agents used are advantageously short-chain hydrocarbons, such as butanes (C4), pentanes (C5), hexanes (C6) and/or heptanes (C7). The solvents used are more advantageously butanes (C4), pentanes (C5) and hexanes (C6), also referred to as C4-C6 fraction.

The solvent used in the deasphaltation serves to dissolve soluble constituents present in the asphaltene-containing fuel, for example aliphatics, aromatics and paraffins. The asphaltene faction present in the asphaltene-containing fuel, i.e. the fraction containing asphaltenes and heavy metals, is insoluble in the solvent used. With regard to the asphaltenes, the solvent thus functions effectively as an "anti-solvent".

After the deasphaltation of the fuel within the deasphaltation unit, the essentially asphaltene-free fuel, i.e. the deasphalted fuel, and the solvent are sent to the solvent recovery unit. Within the solvent recovery unit, the solvent is purified and separated from the deasphalted fuel. The separation is effected by distillation, by evaporating the lower-boiling solvent and drawing it off from the mixture.

Evaporation of the solvent requires heating thereof. The solvent recovery downstream of the deasphaltation typically requires an inlet temperature of about 200° C. Typical temperatures here are just below the critical temperature of the solvent used for deasphaltation.

In a particularly advantageous configuration of the invention, the waste heat from the turbine offgas is utilized for separation of the solvent from the deasphalted fuel. This is a direct transfer of the heat from the turbine offgas to or into the purification process. For this purpose, the stream comprising essentially deasphalted fuel and solvent is advantageously heated by the waste heat from the turbine offgas. The stream is appropriately heated before it enters a separation unit.

For this purpose, the heat transfer of the waste heat from the turbine offgas to the mixture of deasphalted fuel and the solvent is advantageously effected via a heat exchanger connected upstream of the separation unit. The hot turbine offgas flows through the heat exchanger and as it does so heats the mixture of solvent and deasphalted fuel. By virtue of this direct heat integration, the solvent is thus processed without external heating.

The solvent separated from the deasphalted fuel in the solvent recovery unit is advantageously recycled into the deasphaltation unit and utilized here again for deasphaltation of an asphaltene-containing fuel supplied.

In a further configuration of the invention, the asphaltene-containing fuel, before being sent to the deasphaltation unit, is sent to a first separation stage in which a first substream comprising low-boiling fuel constituents is separated from the fuel. Low-boiling constituents present in the first substream are essentially short-chain hydrocarbons such as butanes (C4), pentanes (C5), hexanes (C6) and/or heptanes (C7).

The separating-off of such a first substream thus gives a fraction utilizable as solvent within the processing operation. Accordingly, it is advantageous when the first substream is fed to the deasphaltation unit in addition to the solvent returned from the solvent recovery unit.

The separation of the first substream from the asphaltene-containing fuel is appropriately effected by distillation. For this purpose, the first separation stage used is advantageously a pre-flash column.

More advantageously, the separating of the first substream from the fuel utilizes the waste heat from the turbine offgas. In other words, the first substream is separated off by the heating of the asphaltene-containing fuel by means of the turbine offgas. For this purpose, the waste heat from the turbine offgas is advantageously introduced into the first separation stage by means of a heat exchanger. The hot turbine offgas flows through the heat exchanger and as it does so heats the fuel to be purified. In this process step too, the turbine offgas thus directly supplies the necessary heat for distillative separation of the first substream and the asphaltene-containing fuel.

After the first substream has been separated off, the fuel is advantageously sent to a second separation stage. The fuel sent to the second separation stage is essentially a bottoms fraction comprising higher-boiling alkanes and high-boiling constituents such as the heavy metals and asphaltenes.

The fuel is advantageously heated before it is sent to the second separation stage. Temperatures of up to 450° C. are appropriate here. The heating of the fuel advantageously likewise utilizes the waste heat from the turbine offgas, i.e. the fuel, before being sent to the second separation stage, is heated directly by means of the waste heat from the turbine offgas. Accordingly, no external heating is necessary at this point either. Instead, the waste heat from the turbine offgas is transferred to the asphaltene-containing fuel. Preference is given to utilizing a heat exchanger connected upstream of the second separation stage for this purpose.

In the second separation stage, a particular advantage is given to separating a second substream from the fuel. The separation of the second substream from the fuel is appropriately likewise effected by distillation. For this purpose, the second separation stage used is advantageously a phase separator, called a flash column. The second substream separated in the second separation stage contains essentially long-chain alkanes and has been depleted of vanadium.

Before being sent to the second separation stage, the fuel is advantageously additionally heated by the second substream separated from the fuel. The heat is ideally likewise transferred here from the second substream to the fuel by means of a heat exchanger. The substream separated off in the second separation stage flows through the heat exchanger and as it does so heats the asphaltene-containing fuel.

Appropriately, the second substream is itself cooled as it heats the fuel. Thus, the temperature of the substream before being sent to a gas turbine is lowered to the maximum temperature of about 70° C. and hence the conditions for subsequent conversion to power are created. This is an internal heat transfer in the form of a coupling of two process steps for heat transfer purposes.

The cooled second substream is advantageously sent to a gas turbine. In a particularly advantageous configuration of the invention, the cooled second substream is sent to and converted to power in a vanadium-sensitive high-performance turbine. Since the second substream no longer contains any vanadium, no additives are required here, and there is likewise no risk of turbine damage.

Further advantageously, the second substream, before being sent to the gas turbine, is utilized for heating of the stream of deasphalted fuel and solvent sent to the solvent recovery unit. In this case, the second substream transfers some of its excess heat to this stream. Appropriately, the heat is transferred by means of a heat exchanger. This is an internal heat transfer in the form of a coupling of two process steps of the process for heat exchange purposes.

The above-described processes for separation of the first and second substreams from the asphaltene-containing fuel in the corresponding separation stages can be summarized by the term "preliminary concentration of the fuel".

Preferably, the sulfur present in the fuel is depleted by the preconcentration of the fuel, and by the subsequent deasphaltation of the fuel. At the same time, there is also a fall in the concentration of the sulfuric acid formed from the sulfur during the combustion of the fuel, which results in a lower sulfuric acid dew point. Owing to the resultant lower tendency to condensation by sulfuric acid, the risk of corrosion is reduced. Depending on the residual sulfur content and the correlated sulfuric acid dew point, lower offgas temperatures are achievable, which are in turn equivalent to a high overall power plant efficiency. For this purpose, a steam turbine is advantageously connected downstream of the gas turbine (combined-cycle power plant).

After the second substream has been separated off, the fuel has been concentrated in asphaltenes and heavy metals. The fuel is then appropriately supplied to the deasphaltation unit in which asphaltenes present in the fuel are separated off. Within the deasphaltation unit—but before the actual deasphaltation—the fuel is appropriately cooled to temperatures within a temperature range between 60° C. and 120° C. that are advantageous for the deasphaltation.

The fuel to be deasphalted is advantageously cooled by means of an available low-temperature stream from a power plant process that has a lower temperature than the fuel stream itself. In other words, the heat from the fuel is transferred to lower-temperature streams available in the power plant process, with cooling of the fuel itself. Removal of heat via generally costly cooling water is thus unnecessary. This further reduces the energy consumption in the purification of an asphaltene-containing fuel. It is appropriate here to utilize fuels stored in tanks that are being sent to further utilization. These fuels are appropriately at ambient temperature, and so the heat from the fuel can be transferred to these fuels and hence removed.

The deasphaltation itself is effected by ultrafast mixing of the fuel and the solvent in a corresponding mixing element and by the subsequent precipitation of the asphaltenes or asphaltene particles. The asphaltene particles are advantageously separated from the fuel according to their particle size. The asphaltenes separated from the fuel are appropriately drawn off from the deasphaltation unit and sent to a further use.

Appropriately, the deasphalted fuel, after the removal of the solvent, is sent to a gas turbine and converted to power therein. Residues of vanadium and/or heavy metals are still possible in this deasphalted fuel. However, these proportions are sufficiently low that the fuel is sent advantageously to a vanadium-resistant standard turbine and can be energetically utilized thereby.

In a further-advantageous configuration of the invention, the waste heat from the turbine offgas is first transferred to a heat transfer circuit. The heat transfer to the process for fuel purification (or to the apparatus components used for the purpose) is effected only subsequently proceeding from the heat transfer circuit. The waste heat from the turbine offgas is utilized indirectly when a heat transfer circuit is present. Such a process regime is advantageous for safety reasons since the hot turbine offgas, i.e. the flue gas and the fuel stream to be heated, do not need to be guided through the same apparatus. In principle, heat transfer is possible proceeding from the heat transfer circuit to all processes in which temperature control is required.

The heat transfer circuit utilized is advantageously a secondary circuit for steam raising. In an advantageous configuration of the invention, the steam raised in such a secondary carrier circuit by the waste heat from the turbine offgas within the heat transfer circuit is utilized for the recovery of solvent in the solvent recovery unit. The waste heat from the gas turbine here heats a fluid circulating in the heat transfer circuit, which in turn provides heat for the solvent recovery. The heat transfer circuit is thus connected between the gas turbine and the fuel purification.

Further advantageously, the steam raised is utilized for preconcentration of the fuel in the separation of the first substream and/or for preconcentration of the fuel for preconcentration of the oil in the separation of the second substream from the fuel. Here too, the waste heat from the gas turbine is transferred to a fluid circulating in the heat transfer circuit, which transfers heat for the pre-treatment of the asphaltene-containing fuel thereto. Remaining residual energy from surplus steam raised is appropriately converted to power with a steam turbine. The heat transfer circuit appropriately takes the form of a vapor stage.

Overall, the presence of surplus waste heat from a turbine offgas permits the energy-optimized direct and/or indirect integration of the deasphaltation of a fuel into an overall power plant process. The direct utilization of the waste heat from a turbine offgas is effected in the context of the separation of the solvent from the deasphalted fuel, in the separation of the first substream from the asphaltene-containing fuel and/or in the heating of the fuel prior to supply thereof to a second separation stage.

The indirect utilization of waste heat is achieved by heat transfer of the waste heat from a turbine offgas to a heat transfer circuit. As required, combined utilization composed of direct transfer of the waste heat from a turbine offgas and simultaneous indirect utilization of waste heat is of course also possible.

The second object of the invention is achieved in accordance with the invention by an apparatus for purification of an asphaltene-containing fuel, comprising a deasphaltation unit for separating off asphaltenes present in the fuel to form an essentially deasphalted fuel by means of a solvent, and a solvent recovery unit, coupled for flow purposes to the deasphaltation unit, for separation of the solvent from the deasphalted fuel on completion of separation of the asphaltenes, wherein the purifying of the asphaltene-containing fuel can utilize the waste heat from a turbine offgas that forms in a conversion of fuel to power in a gas turbine.

Such an apparatus permits the efficient and reliable purification of asphaltene-containing fuel via an energy-optimized integration of the deasphaltation process and the recovery of solvent in an overall power plant process.

In order to be able to free the asphaltene-containing fuel of asphaltenes and heavy metals, it is sent to the deasphaltation unit. For this purpose, a feed conduit is appropriately connected to the deasphaltation unit. Within the deasphaltation unit, asphaltenes present in the fuel are separated from the fuel. For this purpose, a solvent ("anti-solvent") containing short-chain alkanes is used, which is appropriately used for dissolution of soluble constituents present in the asphaltene-containing fuel, for example of aliphatics, aromatics and paraffins.

On completion of deasphaltation of the fuel, it is sent to the solvent recovery unit together with the solvent. For this purpose, an output conduit is appropriately connected to the deasphaltation unit, which is coupled for flow purposes to a feed conduit to the solvent recovery unit.

More advantageously, the solvent recovery unit is coupled to an offgas conduit of a gas turbine for heat transfer purposes. In this way, waste heat from the turbine offgas is available for separation of the solvent from the deasphalted fuel. For this purpose, the hot turbine offgas flows through a heat exchanger that has been inserted into the feed conduit to the solvent recovery unit.

The heat is transferred to the mixture of deasphalted fuel and solvent that flows through the feed conduit to the solvent recovery unit. The heated mixture is then sent to the solvent recovery unit for separation of the solvent from the deasphalted fuel. The solvent recovery unit advantageously takes the form of a distillation column.

After the separation of the fuel and hence the recovery of the solvent, it is recycled into the deasphaltation unit. For this purpose, the solvent recovery unit has a recycle conduit coupled to a feed conduit to the deasphaltation unit for flow purposes. The solvent thus circulates in a circuit between the solvent recovery unit and the deasphaltation unit.

More advantageously connected upstream of the deasphaltation unit for flow purposes is a first separation stage for separation of a first substream comprising low-boiling fuel constituents—especially short-chain hydrocarbons, such as butanes (C4), pentanes (C5), hexanes (C6) and/or heptanes (C7), from the fuel. The first substream is correspondingly suitable as solvent. It is advantageously sent to a solvent collection vessel. Appropriately, for this purpose, a removal conduit is connected to the first separation stage and is coupled for flow purposes to a feed conduit to a corresponding solvent collection vessel.

The first substream is separated off via introduction of the waste heat from a turbine offgas. In an advantageous configuration, for this purpose, the first separation stage—advantageously in the form of a distillation unit—is coupled for heat transfer purposes to an offgas conduit from a gas turbine. The waste heat from the turbine offgas is transferred to the first separation stage. For this purpose, a heat exchanger is appropriately connected to the first separation stage and heats the asphaltene-containing fuel that flows into the first separation stage. The first substream evaporates at the same time and is drawn off from the first separation stage.

Preferably connected downstream of the first separation stage for flow purposes is a second separation stage for separation of a second substream from the fuel. For this purpose, an output conduit from the first separation stage is advantageously coupled to a feed conduit to the second separation stage for flow purposes. The second separation stage advantageously takes the form of a phase separator. The second substream separated off in the second separation stage contains essentially longer-chain alkanes and has been depleted of vanadium.

In a configuration, the second separation stage comprises a feed conduit coupled for heat transfer purposes to an offgas conduit from a gas turbine. For coupling for heat transfer purposes, the turbine offgas flows through a heat exchanger that has appropriately been inserted into the feed conduit.

It is further advantageous when a first output conduit from the second separation stage has been coupled for heat transfer purposes to the feed conduit to the second separation stage. For this purpose, a further heat exchanger has been inserted into the feed conduit to the second separation stage. The second substream separated from the asphaltene-containing fuel is removed via the first output conduit from the second separation stage. When it passes through the heat exchanger, this heated second substream releases excess heat to the fuel leaving the first separation stage and heats it. This is effected in addition to the heating by means of turbine offgas. Accordingly, this is likewise an internal heat transfer.

The second substream that has been separated off is sent via the first output conduit from the second separation stage to a gas turbine. For this purpose, the first output conduit from the second separation stage is appropriately coupled to a gas turbine for flow purposes. Since the second substream no longer contains any vanadium, it can be converted to power in a vanadium-sensitive high-performance turbine. Preferably, the first output conduit from the second separation stage is coupled to a feed conduit to a corresponding vanadium-sensitive high-performance turbine.

Appropriately, a second output conduit from the second separation stage is coupled to a feed conduit to the deasphaltation unit for flow purposes. In this way, the fuel to be deasphalted is sent to the deasphaltation unit. For supply of the deasphalted fuel to the solvent recovery unit—as already stated—the output conduit from the deasphaltation unit is coupled for flow purposes to the feed conduit to the solvent recovery unit.

It is further advantageous when the first output conduit from the second separation stage is coupled for heat transfer purposes to the feed conduit to the solvent recovery unit. Appropriately, for this purpose, a further heat exchanger has been inserted into the feed conduit to the solvent recovery unit. The second substream separated from the asphaltene-containing fuel in the second separation stage flows through this heat exchanger.

As it does so, the second substream transfers some of its excess heat to the mixture of the deasphalted fuel and solvent leaving the deasphaltation unit. The heat exchanger thus provides additional heat for solvent recovery. This is an internal heat transfer between the respective apparatus components, i.e. the separation stage and the solvent recovery unit.

Preferably, an output conduit from the solvent recovery unit is coupled to a gas turbine for flow purposes. After the solvent has been removed, the deasphalted fuel is fed via this coupling to a gas turbine and converted to power therein.

Further advantageously, the apparatus comprises a heat transfer circuit coupled to an offgas conduit of a gas turbine for heat transfer purposes. The waste heat from the turbine offgas is transferred indirectly via the heat transfer circuit to the respective media or apparatus components to be heated. The heat transfer circuit here advantageously takes the form of a secondary circuit for steam raising.

In order to transfer the heat from the heat transfer circuit to the process for purifying a fuel to be deasphalted, the heat transfer circuit is advantageously coupled for heat transfer purposes to the solvent recovery unit. It is further advantageous when the first separation stage and/or the second separation stage are coupled to the heat transfer circuit for heat transfer purposes.

Further advantageous configurations for the apparatus are apparent from the dependent claims directed to the process. In this case, it is possible to apply the advantages mentioned for the process and its developments to the apparatus mutatis mutandis.

BRIEF DESCRIPTION OF THE DRAWINGS

Working examples of the invention are elucidated hereinafter with reference to a drawing. The figures show.

DETAILED DESCRIPTION OF INVENTION

Figure 1:
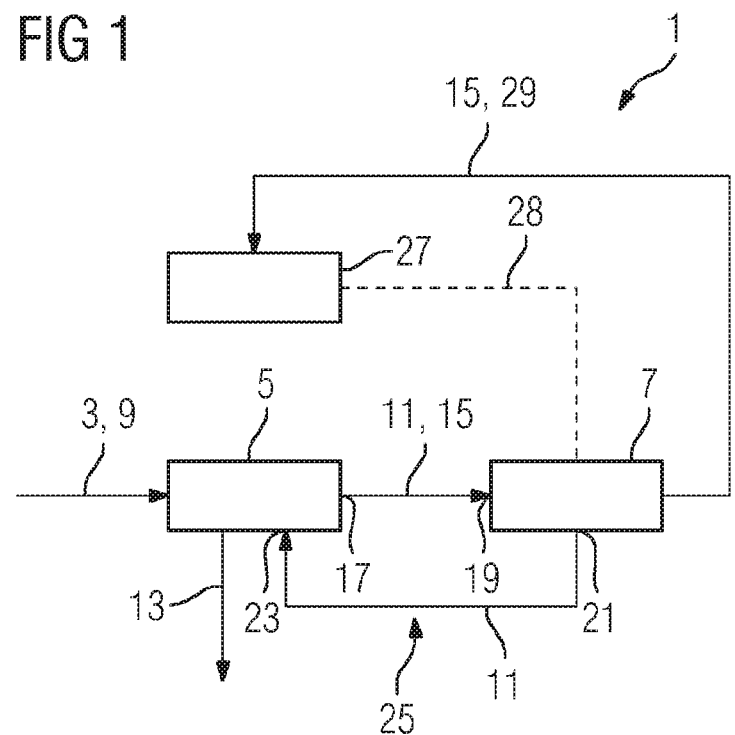
FIG. 1 a schematic diagram of an apparatus for purification of asphaltene-containing fuel without pre-concentration of the fuel, FIG. 2 a schematic diagram of an apparatus for purification of asphaltene-containing fuel with preconcentration of the fuel, FIG. 3 a detailed diagram of the apparatus according to FIG. 2, FIG. 4 a further schematic diagram of an apparatus for purification of an asphaltene-containing fuel without pre-concentration of the fuel, and FIG. 5 a further schematic diagram of an apparatus for purification of an asphaltene-containing fuel with preconcentration of the fuel.

FIG. 1 shows a schematic of an apparatus 1 for purification of an asphaltene-containing fuel 3 without preconcentration of the fuel 3.

The apparatus 1 comprises a deasphaltation unit 5 and a solvent processing unit 7 coupled to the deasphaltation unit 5 for flow purposes. The fuel 3 is fed to the deasphaltation unit 5 via a feed conduit 9 connected thereto. On entry into the deasphaltation unit 5, the fuel is at a temperature of about 70° C. The fuel 3 is freed here of asphaltenes and heavy metals.

The asphaltenes and heavy metals are separated off using a solvent 11 containing essentially butanes (C4), pentanes (C5) and hexanes (C6). In the deasphaltation, the solvent 11 serves to dissolve soluble constituents present in the asphaltene-containing fuel 3. The asphaltenes present in the asphaltene-containing fuel 3 are insoluble in the solvent 11 used, and so the solvent 11 is an "anti-solvent" with respect to the asphaltenes.

The asphaltenes and heavy metals separated off are sent via a draw-off conduit 13 connected to the deasphaltation unit 5 to a workup which is otherwise unspecified in the present context and subsequent utilization in apparatuses correspondingly designed for the purpose. The now deasphalted fuel 15 is sent together with the solvent 11 to the solvent recovery unit 7.

For this purpose, an output conduit 17 is connected to the deasphaltation unit 5 and is coupled to a feed conduit 19 to the solvent recovery unit 7 for flow purposes. In the solvent recovery unit 7, the solvent 11 is separated from the deasphalted fuel 15 and returned back to the deasphaltation process.

For recovery of the solvent 11, a recycle conduit 21 is connected to the solvent recovery unit 7 and is connected to a feed conduit 23 to the deasphaltation unit 5 for flow purposes. The solvent 11 thus circulates in a circuit 25 between the solvent recovery unit 7 and the deasphaltation unit 5.

The solvent 11 is separated off in the solvent recovery unit 7 by thermal means through evaporation of the solvent 11. For this purpose, the mixture of solvent 11 and the deasphalted fuel 15 is heated to about 200° C. In order to provide the heat required for the purpose, the waste heat from a turbine offgas is utilized. For this purpose, the solvent recovery unit 7 is coupled to a gas turbine 27 for heat transfer purposes. The heat transfer coupling is indicated in the present context in general terms by the line 28.

The gas turbine 27 provides sufficient "free" waste heat to operate the process without external heating and associated additional fuel costs. The purification of the asphaltene-containing fuel 3 is effected essentially without reduction of the power plant efficiency. The waste heat from the gas turbine 27 is utilized directly in the present context.

After the solvent 11 has been separated off, the deasphalted fuel 15 is fed to the gas turbine 27 for conversion to power and converted to power therein for energy generation. For this purpose, an output conduit 29 from the solvent recovery unit 7 is connected to the gas turbine 27 for flow purposes. Since the temperature of the deasphalted fuel 15 on entry into the gas turbine should be not more than 70° C., the fuel is cooled beforehand.

Figure 2:
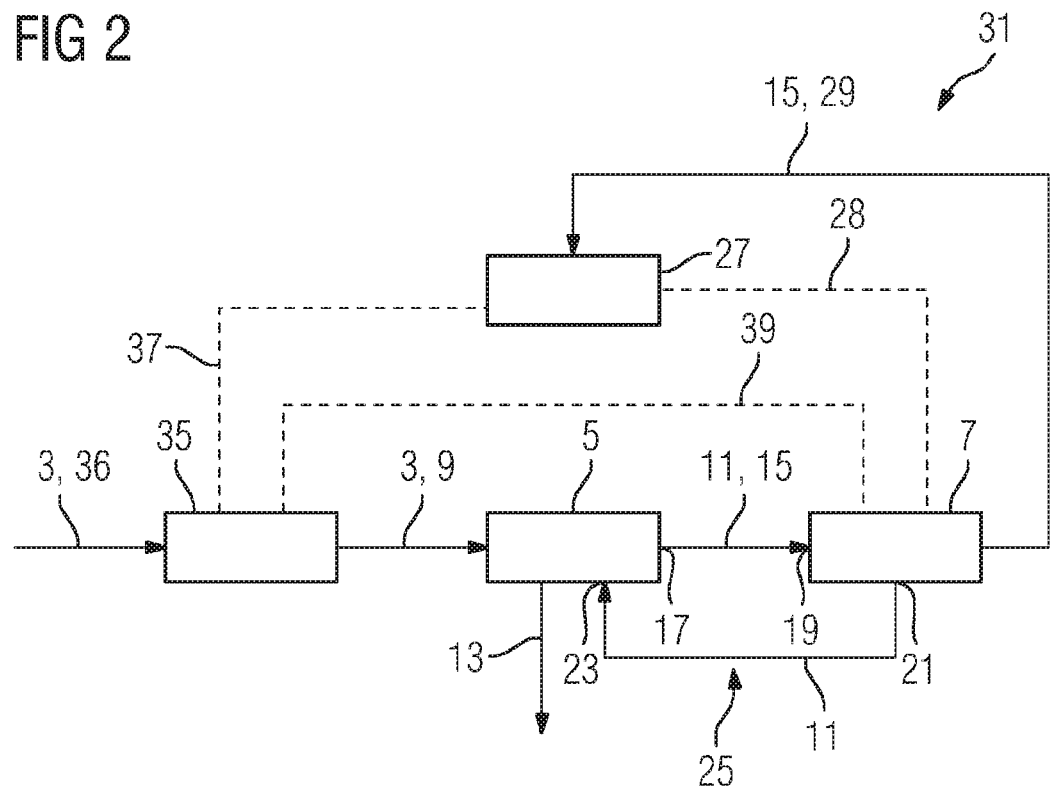

FIG. 2 shows a further schematic diagram of an apparatus 31 for purification of an asphaltene-containing fuel 3. The apparatus 31 also comprises the deasphaltation unit 5, and also the solvent processing unit 7 coupled to the deasphaltation unit 5 for flow purposes. The essential difference from the apparatus 1 according to FIG. 1 in the present context is that the fuel 3 to be deasphalted is first preconcentrated in the present context before it is sent to the actual deasphaltation.

For this purpose, FIG. 2 in quite general terms shows a separation unit 35. The fuel 3 to be deasphalted is sent to the separation unit 35 via a feed conduit 36. Within the separation unit 35 comprising a first separation stage and/or a second separation stage, as required, one or more fractions of low boilers and/or medium boilers are separated from the fuel 3. After one or more fractions have been separated off, fuel 3 has been enriched in asphaltenes and heavy metals. Only then is the enriched fuel 3 sent to the deasphaltation unit 5. For a more detailed description of the operation of preconcentration, reference is made at this point to the description relating to FIG. 3 which follows.

As already described in FIG. 1, the fuel 3 is freed of asphaltenes and heavy metals within the deasphaltation unit 5 by means of the solvent 11. The asphaltenes and heavy metals separated off are sent via the draw-off conduit 13 to a workup and subsequent utilization. The fuel 15 deasphalted after the separation is sent together with the solvent 11 to the solvent recovery unit 7 in which the solvent 11 is separated from the deasphalted fuel 15 and returned back to the deasphaltation process.

As already described, the solvent 11 is separated off in the solvent recovery unit 7 by thermal means by evaporation of the solvent 11 by means of the waste heat from the offgas from the gas turbine 27. The solvent separated off is returned to the deasphaltation unit 5 via the recycle conduit 21 of the solvent recovery unit 7. The deasphalted fuel 15 is sent via the output conduit 29 from the solvent recovery unit 7 to the conversion to power in the gas turbine 27.

In addition to the separation of the solvent 11 from the deasphalted fuel 15, the offgas from the gas turbine 27 is utilized for separation of that or any fractions of low boilers and/or medium boilers from the asphaltene-containing fuel 3 within the separation unit 35—i.e. within the process for preconcentration of the asphaltene-containing fuel. For this purpose, the separation unit 35 is coupled to the gas turbine 27 for heat transfer purposes. The coupling for heat transfer purposes is indicated in the present context in general terms by the line 37.

In addition, the heat present in the process is transferred internally between the separation unit 35 and the solvent recovery unit 7. This is signified by the line 39. A more detailed representation and the corresponding description for this purpose can be found in FIG. 3 described hereinafter.

Figure 3:
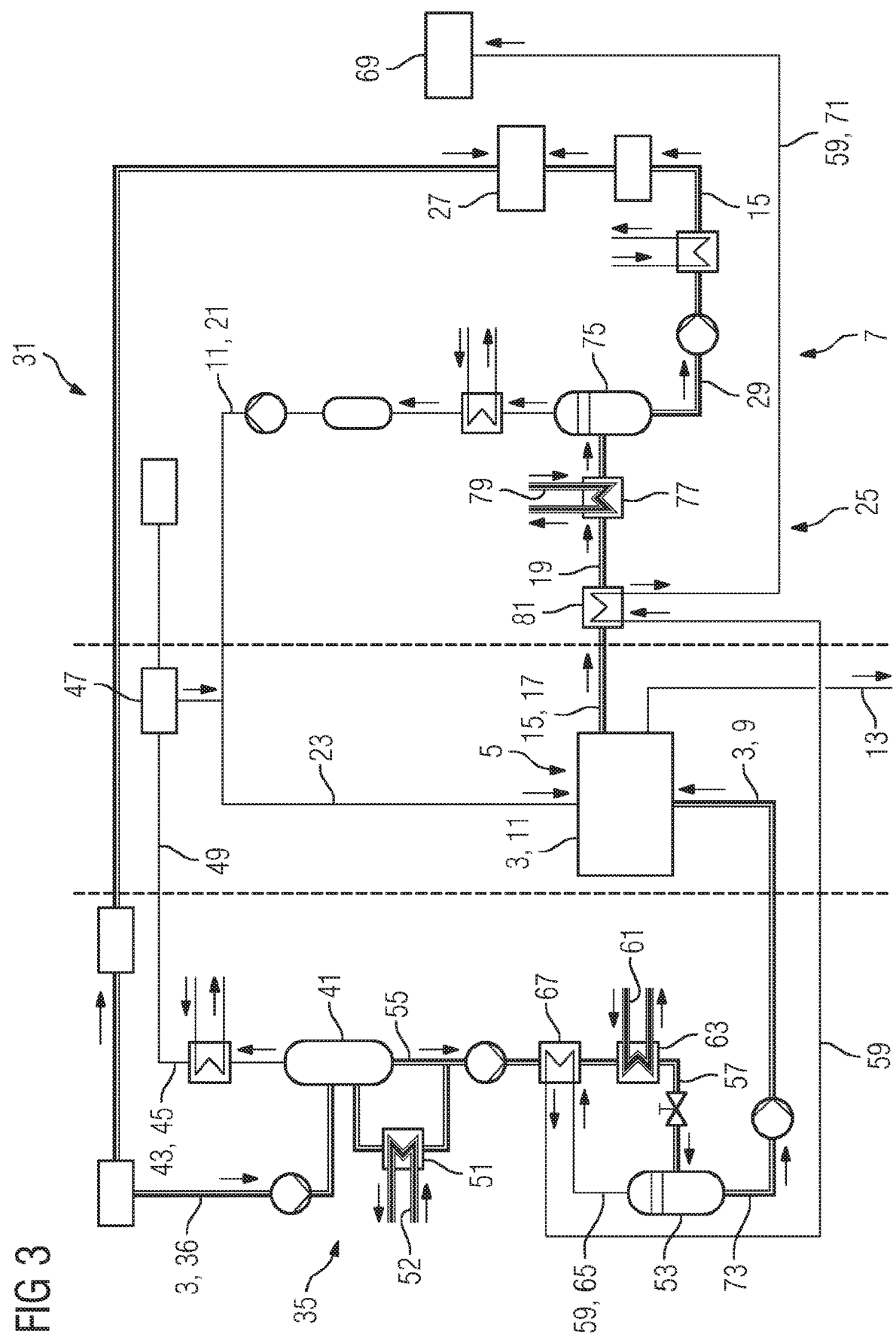

FIG. 3 correspondingly shows the apparatus 31 according to FIG. 2 in a more detailed representation. The apparatus comprises the deasphaltation unit 5, the solvent recovery unit 7 coupled to the deasphaltation unit 5 for flow purposes, and the separation unit 35 connected upstream of the deasphaltation unit 5 for flow purposes.

For pretreatment or preconcentration of the asphaltene-containing fuel 3, it is sent through the feed conduit 36 with a first separation stage 41 in the form of a distillation unit (as part of a separation unit 35). In the first separation stage 41, a first substream 43 comprising low-boiling fuel constituents is separated from the asphaltene-containing fuel 3.

The first substream 43 contains essentially short-chain hydrocarbons, such as butanes (C4), pentanes (C5), hexanes (C6) and/or heptanes (C7), and is correspondingly suitable as solvent. Accordingly, the first substream 43 is withdrawn from the first separation stage 41 via a draw-off conduit 45 and sent to a solvent collection vessel 47. For this purpose, the draw-off conduit 45 is coupled to a feed conduit 49 to the corresponding solvent collection vessel 47 for flow purposes.

The first substream 43 is removed via the introduction of the waste heat from the offgas from the gas turbine 27. For this purpose, a heat exchanger 51 is connected to the first separation stage 41 and is coupled to an offgas conduit 52 from the gas turbine 27 for heat transfer purposes. The heat exchanger 51 heats the asphaltene-containing fuel 3 that flows within the first separation stage 41. The first substream 43 evaporates.

A second separation stage 53 in the form of a phase separator is connected downstream of the first separation stage 41 for flow purposes. For this purpose, an output conduit 55 from the first separation stage 41 is coupled to a feed conduit 57 to the second separation stage 53 for flow purposes. In the second separation stage 53, a second substream 59 is separated from the fuel 3 and contains essentially long-chain alkanes and has been depleted of vanadium.

The second substream 59 is likewise separated from the fuel 3 via the utilization of the waste heat from the offgas from the gas turbine. The fuel 3 is heated to temperatures of up to 450° C. before being sent to the second separation stage 53. For this purpose, feed conduit 57 to the second separation stage is coupled to an offgas conduit 61 from the gas turbine for heat transfer purposes.

The turbine offgas flows through a heat exchanger 63 that has been inserted into the feed conduit 57 to the second separation stage 53. In this case, the fuel 3 leaving the first separation stage 41 is heated before it enters the second separation stage 41.

In addition, a first output conduit 65 from the second separation stage 53 is coupled to the feed conduit 57 to the second separation stage 53 for heat transfer purposes. This is effected via a further heat exchanger 67 inserted into the feed conduit 57 to the second separation stage 53. The second substream 59 separated from the fuel 3 in the second separation stage 53 passes through the heat exchanger 67 and, as it passes through the heat exchanger 67, releases excess heat to the fuel 3 leaving the first separation stage 41.

In other words, the fuel 3 leaving the first separation stage 41, in addition to the heating by the turbine offgas, is also heated by the second substream 59 separated from the fuel 3. The second substream 59 is itself brought here to the lower temperatures of not more than 70° C. necessary for conversion to power in the turbine 69.

Since the second substream 59 no longer contains any vanadium, the separated second substream 59 is sent to a high-performance turbine 69. For this purpose, the first output conduit 65 from the second separation stage 53 is coupled to a feed conduit 71 to the corresponding vanadium-sensitive high-performance turbine 69 for flow purposes.

Also connected to the second separation stage 53 is a second output conduit 73 coupled to the feed conduit 9 to the deasphaltation unit 5 for flow purposes. In this way, the pretreated fuel 3 that is now to be deasphalted is sent to the deasphaltation unit 5. Before the actual deasphaltation, the fuel 3 is cooled to the temperatures in the range between 60° C. and 80° C. that are necessary for the deasphaltation.

The deasphaltation itself is effected by ultrafast mixing of the fuel 3 and the solvent 11 in an appropriate mixing element and by the subsequent precipitate of the asphaltenes or asphaltene particles. The asphaltene particles are advantageously separated from the fuel according to their particle size. The asphaltenes separated from the fuel 3 are drawn off from the deasphaltation unit 5 via a draw-off conduit 13 and sent to a further, otherwise unspecified utilization.

On completion of deasphaltation, the deasphalted fuel 15 is sent together with the solvent to the solvent recovery unit 7 via the coupling for flow purposes of the output conduit 17 from the deasphaltation unit 5 to the feed conduit 19 to the solvent recovery unit 7. The solvent recovery unit 7 takes the form of a distillation column 75. In the distillation column 75, the solvent 11 is separated from the deasphalted fuel 15 and returned back to the deasphaltation process via the recycle conduit 21.

The solvent 11 is likewise separated off via the introduction of the waste heat from the offgas from the gas turbine 27. For this purpose, a heat exchanger 77 is inserted into the feed conduit 19 to the solvent recovery unit 7 and is coupled to an offgas conduit 79 from the gas turbine 27 for heat transfer purposes. Before it enters the distillation column 75, the mixture of deasphalted fuel 15 and solvent 11 is heated to about 200° C. via the heat exchanger 77.

In addition, the mixture of deasphalted fuel 15 and solvent 11 is heated by the second substream 59 separated in the second separation stage 53. For this purpose, the second substream 59 separated from the asphaltene-containing fuel 3 in the second separation stage 53 flows through a further heat exchanger 81 inserted into the feed conduit 19 to the solvent recovery unit 7.

The second substream 59 transfers some of its excess heat here to the mixture of deasphalted fuel 3 and solvent 11 leaving the deasphaltation unit 5. The second substream 59 thus provides additional heat for solvent recovery. This is the internal heat transfer between the separation unit 35—in the present context comprising the first separation stage 41 and the second separation stage 53—and the solvent recovery unit 7, which is already indicated in FIG. 2.

After the solvent 11 has been separated off in the distillation column 75, the deasphalted fuel 15 is sent to the gas turbine 27 for conversion to power and converted to power therein for energy production. For this purpose, the output conduit 29 from the solvent recovery unit 7 is coupled to the gas turbine 27 for flow purposes.

Thus, three streams are obtained from the asphaltene-containing fuel 3 and are utilized differently. Firstly, a first substream 43 is obtained from the fuel 3 and can be used as solvent 11. Secondly, two streams 15, 59 are obtained, which, owing to their different vanadium content, can be converted to power in different gas turbines 27, 69. In addition, the asphaltenes are obtained, and are drawn off from the deasphaltation unit 5 via the draw-off conduit 13.

Figure 4:
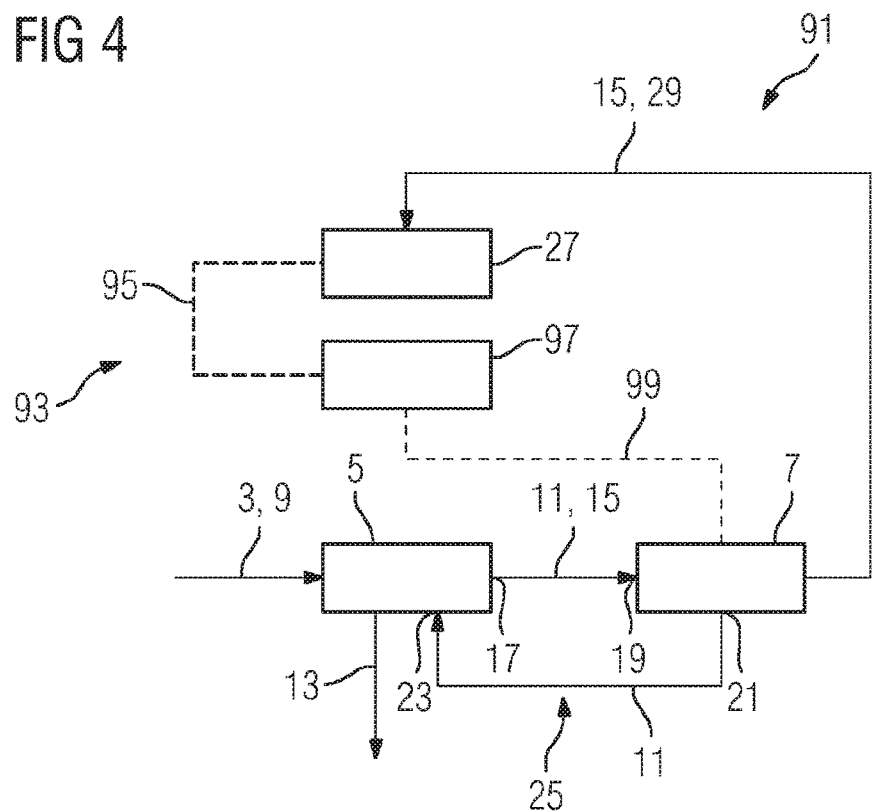

FIG. 4 shows a further schematic diagram of an apparatus 91 for purification of an asphaltene-containing fuel 3. Like the apparatus 1 according to FIG. 1 as well, the purification is effected without pretreatment and without preconcentration of the fuel 3.

The apparatus 91 comprises the deasphaltation unit 5 and the solvent processing unit 7 coupled thereto for flow purposes. The fuel 3 is sent to the deasphaltation unit 5 via the feed conduit 9, where it is freed of asphaltenes and heavy metals. With regard to the description of the deasphaltation process and of the solvent recovery, reference is made at this point to the detailed description relating to apparatuses 1, 31 according to FIGS. 1 to 3.

By contrast with the above-described apparatuses 1, 31, the apparatus 91 comprises a heat transfer circuit 93. The heat transfer circuit 93 is coupled to an offgas conduit 95 from the gas turbine 27 for heat transfer purposes and thus constitutes a secondary carrier circuit. The waste heat from the turbine offgas is thus transferred indirectly to the media or apparatus components to be heated in each case within the context of the deasphaltation process and the solvent recovery.

The heat transfer circuit 93 in the present context takes the form of a vapor stage 97 of a steam circuit. The steam raised in the vapor stage 97 by the waste heat from the turbine offgas in such a circuit 93 is utilized for the solvent recovery within the solvent recovery unit.

Here too, the solvent 11 is separated off in the solvent recovery unit 7 by thermal means via evaporation of the solvent 11. However, the heat required is provided only indirectly via the waste heat from a turbine offgas. Rather than the solvent recovery unit 7 itself being coupled to the gas turbine 27 for heat transfer purposes, the heat transfer circuit 93 in the present context is inserted between the gas turbine 27 and the solvent recovery unit 7.

The waste heat from the gas turbine 27 evaporates the water circulating in the heat transfer circuit 93. The steam formed here then transfers its heat to the mixture of fuel 3 and solvent 11, and condenses as it does so.

For this purpose, the solvent recovery unit 7 is likewise coupled to the heat transfer circuit 93 for heat transfer purposes. This coupling for heat transfer purposes is indicated in the present context in general terms by the line 99.

Such intermediate connection of the heat transfer circuit 93 between the gas turbine 27 and the solvent recovery unit 7 increases safety in the process regime, since the hot offgas from the gas turbine 27 and the fuel 3 to be purified do not have to be guided through the same components of the apparatus 91.

Figure 5:
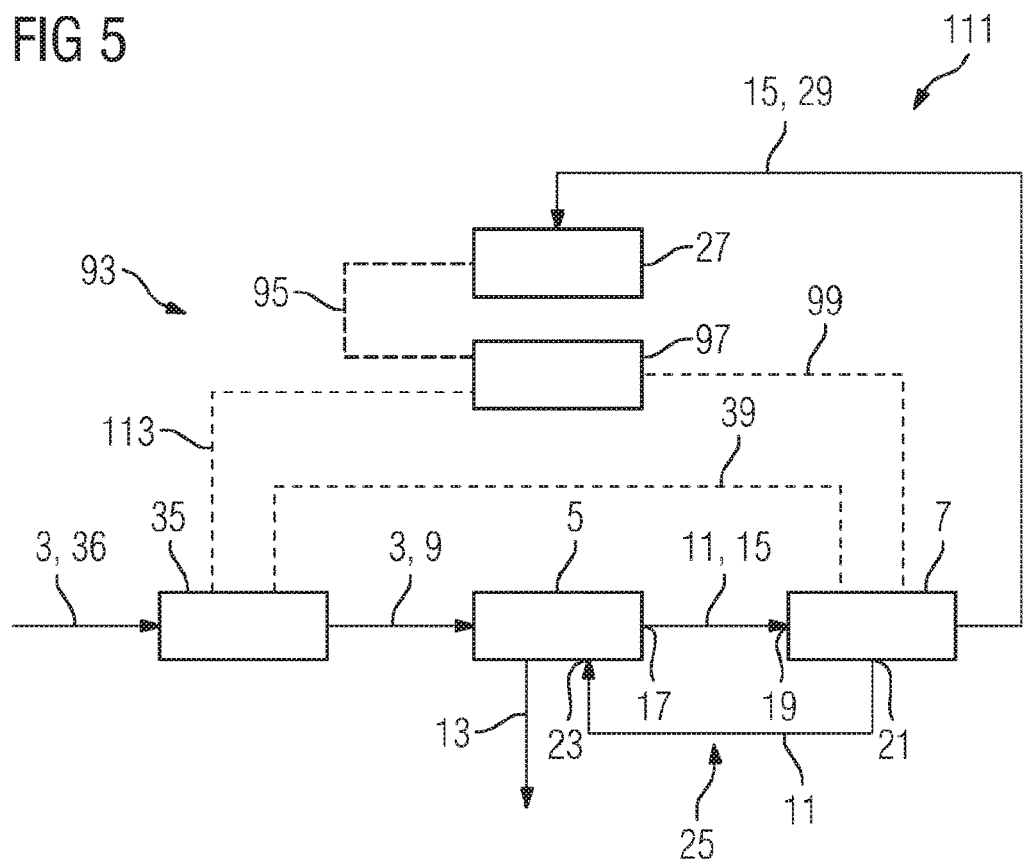

FIG. 5 shows a further schematic diagram of an apparatus 111 for purification of an asphaltene-containing fuel 3. Like all the above-described apparatuses 1, 31, 91, the apparatus 111 also comprises the deasphaltation unit 5 and the solvent processing unit 7 coupled thereto for flow purposes.

The essential difference from the apparatus 91 according to FIG. 4 is that the fuel 3 to be deasphalted is first preconcentrated before being fed to the actual deasphaltation. The preconcentration as such is effected here analogously to the preconcentration as described for FIGS. 2 and 3.

Correspondingly, the apparatus 111 comprises the separation unit 35 in which, as required, one or more fractions of low boilers and/or medium boilers are separated from the fuel 3. Then the fuel 3 that has been enriched in asphaltenes and heavy metals is sent to the deasphaltation unit 5 and freed of asphaltenes and heavy metals by means of the solvent 11. The deasphalted fuel 15 is fed together with the solvent 11 to the solvent recovery unit 7 in which the solvent 11 is separated from the deasphalted fuel 15 and returned back to the deasphaltation unit 5.

The preconcentration and solvent recovery in the present context are effected by the indirect utilization of the waste heat from the offgas from the gas turbine 27. For this purpose, the apparatus 111 is likewise designed with the heat transfer circuit 93 which comprises the vapor stage 97 and is coupled to the offgas conduit 95 from the gas turbine 27 for heat transfer purposes. The waste heat from the turbine offgas is then transferred via the heat transfer circuit 95 both to the separation unit 35 and to the solvent recovery unit 7.

The coupling of the solvent recovery unit 7 to the vapor stage 97 for heat transfer purposes is indicated by the line 99. The coupling of the separation unit 35 to the heat transfer circuit 93 or to the vapor stage 97 for heat transfer purposes in the present context is indicated in general terms by the line 113.

In addition, the heat present in the process—analogously to the apparatus 31 according to FIGS. 2 and 3—is transferred internally between the deasphaltation unit 5 and the solvent recovery unit 7 (line 39).

The invention claimed is:

1. An apparatus for purification of an asphaltene-containing fuel, comprising:
   receiving a flow of fuel into a first separation stage,
   separating the flow of fuel in the first separation stage into a first substream comprising low-boiling fuel constituents and an asphaltene-containing substream of fuel,
   sending the first substream to a deasphaltation unit via a draw-off conduit configured to provide fluid communication for the first substream from a first output of the first separation stage to the deasphaltation unit,
   sending the asphaltene-containing substream of fuel to the deasphaltation unit via an output path that is discrete from the draw-off conduit and that is configured to provide fluid communication for the asphaltene-containing substream of fuel from a second output of the first separation stage to the deasphaltation unit,
   separating off in the deasphalting unit asphaltenes present in the asphaltene-containing substream of fuel by means of a solvent to form an essentially deasphalted fuel, wherein the solvent comprises the low-boiling fuel constituents from the first substream, and
   separating the solvent, on completion of separation of the asphaltenes from the fuel, from the deasphalted fuel in a solvent recovery unit, wherein waste heat from a turbine offgas is utilized for separation of the first substream from the asphaltene-containing substream of fuel.

2. The process as claimed in claim 1, wherein the waste heat from the turbine offgas is utilized for separation of the solvent from the deasphalted fuel.

3. The process as claimed in claim 1, wherein the solvent separated from the deasphalted fuel in the solvent recovery unit is recycled into the deasphaltation unit.

4. The process as claimed in claim 1, wherein the asphaltene-containing substream of fuel, after the first substream has been separated off, is sent to a second separation stage.

5. The process as claimed in claim 4, wherein the waste heat from the turbine offgas is utilized for heating of the asphaltene-containing substream of fuel before it is sent to the second separation stage.

6. The process as claimed in claim 5, wherein a second substream that is vanadium free is separated from a substream of fuel to be deasphaltated in the second separation stage.

7. The process as claimed in claim 6, wherein the asphaltene-containing substream of fuel, before being sent to the second separation stage, is additionally heated by the second substream that is vanadium free.

8. The process as claimed in claim 7, wherein the second substream that is vanadium free is cooled in the heating of the asphaltene-containing substream of fuel.

9. The process as claimed in claim 8, wherein the cooled second substream that is vanadium free is sent to a gas turbine.

10. The process as claimed in claim 6, wherein the substream of fuel to be deasphaltated is sent to the deasphaltation unit in which asphaltenes present in the substream of fuel to be deasphaltated are removed.

11. An apparatus for purification of an asphaltene-containing fuel, comprising:
a first separation stage configured to receive a flow of fuel and to separate the flow of fuel into a first substream comprising low-boiling fuel constituents and an asphaltene containing substream of fuel,
a deasphaltation unit configured to separate off asphaltenes present in the asphaltene containing substream of fuel to form an essentially deasphalted fuel by means of a solvent,
a draw-off conduit configured to provide fluid communication for the first substream from a first output of the first separation stage to the deasphaltation unit,
an output conduit that is discrete from the draw-off conduit and configured to provide fluid communication for the asphaltene containing substream of fuel from a second output of the first separation stage to the deasphaltation unit, and
a solvent recovery unit, coupled for flow purposes to the deasphaltation unit, for separation of the solvent from the deasphalted fuel on completion of separation of the asphaltenes,
wherein the first separation stage coupled for heat transfer purposes to an offgas conduit from a gas turbine and heat from the offgas conduit is used to evaporate the first substream prior to the first substream being delivered to the deasphaltation unit.

12. The apparatus as claimed in claim 11, wherein the solvent recovery unit is coupled for heat transfer purposes to an offgas conduit from the gas turbine.

13. The apparatus as claimed in claim 11, wherein the solvent recovery unit comprises a recycle conduit coupled for flow purposes to a feed conduit to the deasphaltation unit.

14. The apparatus as claim 11, wherein connected downstream of the first separation stage for flow purposes is a second stage configured to receive the asphaltene containing substream of fuel from the output conduit and to separate the asphaltene containing substream of fuel into a second substream of the fuel that is vanadium free and fed to a first output conduit of the second separation stage and a substream of fuel to be deasphaltated.

15. The apparatus as claimed in claim 14, wherein the second separation stage comprises a feed conduit configured to receive the asphaltene containing substream from the output conduit and coupled for heat transfer purposes to an offgas conduit from the gas turbine.

16. The apparatus as claimed in claim 15, where the first output conduit from the second separation stage is coupled for heat transfer purposes to the feed conduit to the second separation stage.

17. The apparatus as claimed in claim 16, wherein the first output conduit from the second separation stage is coupled for flow purposes to a gas turbine.

18. The apparatus as claimed in claim 13, wherein the first substream is delivered to the recycle conduit and then to the deasphaltation unit.

* * * * *